(12) United States Patent
Durvasula et al.

(10) Patent No.: US 12,366,083 B2
(45) Date of Patent: Jul. 22, 2025

(54) AUTOMATIC POOL CLEANER WITH EDGE ENGAGEMENT ASSEMBLY

(71) Applicant: ZODIAC POOL SYSTEMS LLC, Carlsbad, CA (US)

(72) Inventors: Kameshwar Durvasula, Garfield, NJ (US); Ethan Hanan, Teaneck, NJ (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 633 days.

(21) Appl. No.: 17/504,202

(22) Filed: Oct. 18, 2021

(65) Prior Publication Data

US 2022/0034114 A1 Feb. 3, 2022

Related U.S. Application Data

(63) Continuation of application No. 16/983,016, filed on Aug. 3, 2020, now Pat. No. 11,180,926, which is a
(Continued)

(51) Int. Cl.
*E04H 4/16* (2006.01)
*B25J 15/00* (2006.01)
(Continued)

(52) U.S. Cl.
CPC ........ *E04H 4/1654* (2013.01); *B25J 15/0052* (2013.01); *G05D 1/0208* (2013.01); *B08B 9/087* (2013.01); *B25J 5/005* (2013.01)

(58) Field of Classification Search
CPC ................ E04H 4/16; A47L 9/04; A47L 9/16
See application file for complete search history.

(56) References Cited

U.S. PATENT DOCUMENTS 2,362,315 A * 11/1944 Schultze ................ D01G 23/00
222/256
3,390,804 A * 7/1968 Morgan ................ B65F 1/1615
D34/8
(Continued)

FOREIGN PATENT DOCUMENTS

WO WO-2006087133 A1 * 8/2006 ............. A45C 11/36
WO 2016026059 2/2016
(Continued)

OTHER PUBLICATIONS

U.S. Appl. No. 15/963,306, Corrected Notice of Allowability mailed on Jul. 16, 2020, 5 pages.
(Continued)

*Primary Examiner* — Michael D Jennings
(74) *Attorney, Agent, or Firm* — Kilpatrick Townsend & Stockton LLP

(57) ABSTRACT

An autonomous pool cleaner includes a main body, a filter that is removably coupled to the main body, and an edge engagement assembly. The main body includes a top, a bottom, and one or more peripheral walls that extend between the top and the bottom. The filter is accessible for removal or installation via a particular peripheral wall of the one or more peripheral walls. The edge engagement assembly is configured to extend beyond the particular peripheral wall of the main body and removably secure the autonomous pool cleaner to an edge of a swimming pool so that the filter is accessible and vertically removable when the autonomous pool cleaner is secured to the edge.

9 Claims, 10 Drawing Sheets

Related U.S. Application Data continuation of application No. 15/963,306, filed on Apr. 26, 2018, now Pat. No. 10,927,558.

(51) Int. Cl.
*G05D 1/00* (2006.01)
*B08B 9/087* (2006.01)
*B25J 5/00* (2006.01)

(56) References Cited

U.S. PATENT DOCUMENTS

| | | | |
|---|---|---|---|
| 4,900,432 | A | 2/1990 | Arnold et al. |
| 5,782,166 | A * | 7/1998 | Lin ............... A47J 37/0786 126/41 R |
| 6,409,916 | B1 | 6/2002 | Zelas et al. |
| 7,867,389 | B2 | 1/2011 | Hui |
| 8,252,176 | B2 | 8/2012 | Hui |
| 8,307,485 | B2 | 11/2012 | Sumonthee |
| 8,343,339 | B2 | 1/2013 | Sumonthee |
| 8,393,030 | B2 | 3/2013 | Pichon et al. |
| 8,393,031 | B2 | 3/2013 | Pichon et al. |
| 8,393,034 | B2 | 3/2013 | Pichon et al. |
| 8,393,035 | B2 | 3/2013 | Pichon et al. |
| 8,615,836 | B2 | 12/2013 | Pichon et al. |
| 8,627,533 | B2 | 1/2014 | Pichon et al. |
| 8,784,652 | B2 | 7/2014 | Rief et al. |
| 8,997,293 | B2 | 4/2015 | Pichon et al. |
| D782,552 | S | 3/2017 | Casadio et al. |
| 9,657,488 | B2 | 5/2017 | Pichon et al. |
| 9,708,826 | B2 | 7/2017 | Michelon et al. |
| 9,758,980 | B2 | 9/2017 | Ben Don et al. |
| 9,809,989 | B2 | 11/2017 | Blanc Tailleur et al. |
| 10,294,686 | B1 | 5/2019 | Erlich et al. |
| 10,392,824 | B2 | 8/2019 | Witelson et al. |
| 10,426,142 | B2 | 10/2019 | Favie et al. |
| 10,711,417 | B1 * | 7/2020 | Stinson ............... B65F 1/002 |
| 10,927,558 | B2 | 2/2021 | Durvasula et al. |
| 11,180,926 | B2 | 11/2021 | Durvasula et al. |
| 2007/0157422 | A1 * | 7/2007 | Oh ............... A47L 9/0433 15/387 |
| 2010/0037421 | A1 * | 2/2010 | Haan ............... A47L 9/0416 15/383 |
| 2013/0061420 | A1 * | 3/2013 | Vanderstegen-Drake ............... A47L 9/009 15/3 |
| 2014/0137891 | A1 | 5/2014 | Hanan et al. |
| 2014/0263087 | A1 | 9/2014 | Renaud et al. |
| 2015/0076048 | A1 | 3/2015 | Rief et al. |
| 2015/0101135 | A1 | 4/2015 | Witelson et al. |
| 2015/0176297 | A1 | 6/2015 | Pichon et al. |
| 2015/0314453 | A1 | 11/2015 | Witelson et al. |
| 2016/0051913 | A1 | 2/2016 | Witelson et al. |
| 2016/0289988 | A1 | 10/2016 | Maggeni et al. |
| 2017/0037648 | A1 | 2/2017 | Hilel et al. |
| 2017/0051467 | A1 | 2/2017 | Casadio et al. |
| 2017/0057759 | A1 | 3/2017 | Maggeni et al. |
| 2017/0057760 | A1 | 3/2017 | Maggeni et al. |
| 2017/0096828 | A1 | 4/2017 | Moore et al. |
| 2017/0298644 | A1 | 10/2017 | Goldenberg et al. |
| 2017/0335586 | A1 | 11/2017 | Witelson |
| 2018/0002940 | A1 | 1/2018 | Li |
| 2018/0155945 | A1 | 6/2018 | Londono et al. |
| 2020/0056391 | A1 | 2/2020 | Lancry |

FOREIGN PATENT DOCUMENTS

| | | |
|---|---|---|
| WO | 2016196433 | 12/2016 |
| WO | 2019209932 A1 | 10/2019 |

OTHER PUBLICATIONS

U.S. Appl. No. 15/963,306, Notice of Allowance mailed on Jun. 8, 2020, 9 pages.
U.S. Appl. No. 16/983,016, Final Office Action mailed on Jun. 23, 2021, 5 pages.
U.S. Appl. No. 16/983,016, Non-Final Office Action mailed on May 6, 2021, 5 pages.
U.S. Appl. No. 16/983,016, Notice of Allowance mailed on Aug. 3, 2021, 5 pages.
European Application No. 19715320.8, Office Action mailed on Oct. 12, 2021, 3 pages.
International Application No. PCT/US2019/023053, International Preliminary Report on Patentability mailed on Nov. 5, 2020, 8 pages.
International Application No. PCT/US2019/023053, International Search Report and Written Opinion mailed on Jul. 23, 2019, 12 pages.
Australian Application No. 2019261221, First Examination Report mailed on Mar. 28, 2023, 3 pages.
European Application No. 19715320.8, Intention to Grant mailed on Mar. 13, 2023, 8 pages.
Australian Application No. 2019261221, Second Examination Report mailed on Sep. 15, 2023, 2 pages.
Australian Application No. 2019261221, Notice of Acceptance mailed on Oct. 4, 2023, 3 pages.
European Application No. 23188722.5, Extended European Search Report mailed on Oct. 27, 2023, 3 pages.

* cited by examiner

AUTOMATIC POOL CLEANER WITH EDGE ENGAGEMENT ASSEMBLY

CROSS-REFERENCE TO RELATED APPLICATIONS

This application is a continuation of allowed U.S. patent application Ser. No. 16/983,016, filed Aug. 3, 2020, which is a continuation of U.S. patent application Ser. No. 15/963,306, filed Apr. 26, 2018, now U.S. Pat. No. 10,927,558, granted Feb. 23, 2021, the entire contents of both of which applications are incorporated by reference herein in their entireties.

FIELD OF INVENTION

The present invention relates to the field of swimming pool cleaners and, in particular, to a swimming pool cleaner, such as a robotic and/or motorized pool cleaner, with a filter that is installable and removable via a peripheral wall of the pool cleaner and features that facilitate in-water installation and removal of the same.

BACKGROUND

In order to automate pool cleaning, many motorized or automatic pool cleaners have been developed. There are many different types of swimming pool cleaners; however, typically, motorized pool cleaners (which are sometimes also referred to as pool cleaning robots and may be interchangeably referred to herein as pool cleaners, autonomous pool cleaners, pool cleaning robots, and other such variations) use a pump or suction system to clean a pool. The pump or suction system draws a combination of water and dirt/debris, via an intake, into a filter included or installed in the pool cleaner, such as a filter bag or filter box, that is configured to capture the dirt/debris, thereby cleaning the pool water. In some instances, a pool cleaning robot may include cleaning brushes or pressurized jets to dislodge debris from pool surfaces so that the dislodged dirt/debris can be drawn into the filter (via the intake) by the suction of the pump system. As an example, U.S. Pat. No. 8,434,182, which is incorporated by reference herein in its entirety, discloses an autonomous pool cleaner with high pressure cleaning jets that dislodge dirt/debris from pool surfaces so that the dirt/debris can be drawn into and captured in a filter bag (due to suction created by a pump system).

Since filters (e.g., a filter bag or box) collect debris, filters must be periodically serviced (e.g., cleaned, replaced, etc.). In some instances, a pool cleaning robot may exit a pool automatically for this servicing; however, more commonly, an end user must remove the pool cleaner from the pool in order to service the filter. In some of these latter instances, the pool cleaner may be programmed or instructed to move to a water line of a pool. In other instances, an end user needs to move (e.g., pull) the pool cleaner to the water line from a bottom of the pool (e.g., by pulling on a tether to bring the pool cleaning robot to the water line). Either way, the geometry, buoyancy, and/or programming of most pool cleaners causes the front of the pool cleaner to arrive at the water line first.

Unfortunately, most pool cleaners include filters that are only accessible from a top of the pool cleaner. Thus, once a pool cleaner is at the water line, an end user usually needs to lean or bend towards the water line and lift the waterlogged pool cleaner from the water (with water and weight draining slowly). This process is not only inconvenient, but may lead to injuries, such as back injuries, since lifting from a bent over position (and lifting weight disposed beneath and in front of your feet) may be unnatural. Alternatively, an end user may try to bend over the edge of the pool and manipulate the pool cleaner so the end user can access a top loading filter while the pool cleaner is in the pool; however, it is difficult to hold the pool cleaner in an unnatural position (e.g., a position that the pool cleaner will naturally tend to move away from due to its buoyancy and/or geometry) while also servicing the filter. Moreover, a misstep may injure the end user, cause the user to fall into the pool (potentially with interior electronics exposed) and/or damage the pool cleaner.

In view of these issues, at least some pool cleaners include a front loading filter that is accessible when the pool cleaner is disposed at the water line; however, since it is difficult to hold the pool cleaner at the water line while also servicing the filter, these solutions are still difficult to service without an expensive and bulky housing or garage that holds the pool cleaner at the water line. Moreover, a housing or garage disposed at the water line (or any other such device left at the pool edge) may be dangerous to swimmers not expecting to encounter objects on the pool edge while jumping in, turning underwater, or otherwise moving near the pool edge. Housings and garages (or any other such device left at the pool edge) may also be undesirable in at least some pool environments because these devices may provide an unpleasing aesthetic element in a pool environment.

In view of the foregoing, a pool cleaner that includes features that can selectively secure the pool cleaner to a pool edge so that the pool cleaner's filter can be serviced without removing the entire pool cleaner from the pool is desired. It is also desirable to provide these features in a sleek (e.g., aesthetically pleasing) and/or relatively inexpensive manner, without otherwise impacting cleaning operations of the pool cleaner.

SUMMARY

The present invention relates to an autonomous pool cleaner with a main body, a filter that is removably coupled to the main body, and an edge engagement assembly. The main body includes a top, a bottom, and one or more peripheral walls that extend between the top and the bottom. The filter is accessible for removal or installation via a particular peripheral wall of the one or more peripheral walls. The edge engagement assembly is configured to extend beyond the particular peripheral wall of the main body and removably secure the autonomous pool cleaner to an edge of a swimming pool so that the filter is accessible and vertically removable when the autonomous pool cleaner is secured to the edge.

According to another embodiment, an autonomous pool cleaner presented herein includes a main body, a filter, an edge engagement assembly, and onboard control system. The main body top, a bottom, and one or more peripheral walls that extend between the top and the bottom. The filter is removably coupled to the main body and accessible for removal or installation via a particular peripheral wall of the one or more peripheral walls. The edge engagement assembly is configured to extend to extend beyond the particular peripheral wall and selectively secure the autonomous pool cleaner to an edge of a pool. The onboard control system is configured to deploy the edge engagement assembly when the particular peripheral wall is disposed at a water line of the pool and adjacent the edge. Deploying the edge engagement assembly secures the autonomous pool to the edge of the pool in a position where the filter is accessible by an end user standing on the edge.

According to yet another embodiment, the present invention relates to a method for operating an autonomous pool cleaner. The method includes determining that a cleaning operation performed by an autonomous pool cleaner with a filter that is removable from a peripheral wall of the pool cleaner has or should be terminated. Based on the determining, the autonomous pool cleaner is caused to climb a wall towards a water line of a pool. Upon reaching the water line, the autonomous pool cleaner is secured to a pool edge with an edge engagement assembly in a position where the filter is accessible from the pool edge.

Due at least to the aforementioned features, the present invention avoids problems associated with servicing many known pool cleaners. For example, the pool cleaner need not be removed from the pool to change the filter and, thus, injuries associated with lifting a waterlogged pool cleaner from a pool might be avoided. Similarly, the pool cleaner need not be manipulated or held in place at the water line which may also reduce or eliminate risks associated with such activities (e.g., risks of falling into the pool, damaging the pool cleaner, or the end user injuring themselves).

Moreover, since the pool cleaner presented herein includes its own edge engagement assembly, accessories that rest in or around a pool need not be utilized. This may reduce or eliminate costs (including installation and maintenance costs) associated with techniques or devices that extract a pool cleaner from a pool. For example, various lifts, cranes, garages, ladders, etc. need not be installed onto a pool edge or otherwise utilized. This may also improve the cleanliness, safety, and/or aesthetic of a pool. For instance, since various accessories can be removed from (or never installed on) the edge of a pool, the pool cleaner presented herein reduces or eliminates trip hazards (e.g., ladders or garage supports) on the pool edge, thereby improving safety. As another example, hosts for debris and/or algae (e.g., garages that are disposed at least partially in the water) can be removed from (or never installed in) the pool, thereby increasing the cleanliness (and possibly the safety) of the pool. Removing these accessories from the pool and/or pool edge may also improve the aesthetic of the pool. Notably, since the edge engagement assembly extends when the pool cleaner reaches the water line (and is otherwise retracted into or into alignment with the pool cleaner), the pool cleaner provided herein provides these advantages without impacting cleaning operations of the pool cleaner.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

Like numerals identify like components throughout the figures.

DETAILED DESCRIPTION

Figure 1A:
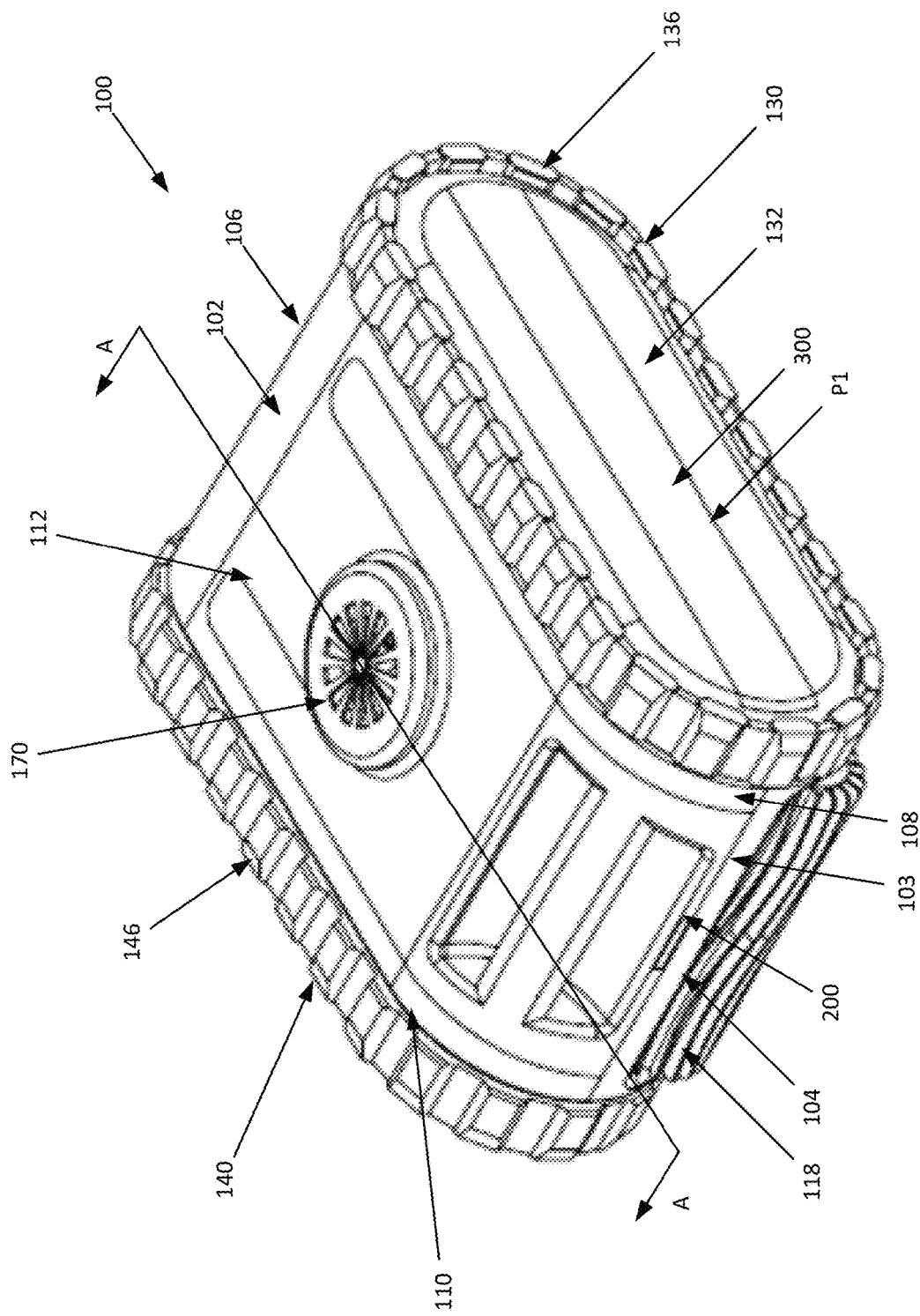
FIGS. 1A and 1B are top perspective views of an autonomous pool cleaner including a filter and an edge engagement assembly, according to an exemplary embodiment of the present invention, the filter being fully installed in FIG. 1A and partially removed in FIG. 1B.

The following description is not to be taken in a limiting sense but is given solely for the purpose of describing the broad principles of the present invention. Embodiments of the present invention will be described by way of example, with reference to the above-mentioned drawings showing elements and results according to the present invention.

Generally, the autonomous pool cleaner presented herein includes a filter that is installable and removable via a peripheral wall of the pool cleaner and an edge engagement assembly that allows the autonomous pool cleaner to secure itself to an edge of a pool. That is, the autonomous pool cleaner (which may be interchangeably referred to herein as a pool cleaner, an autonomous pool cleaner, a pool cleaning robot, and other such variations) can clip or secure itself to an edge of a pool when the pool cleaner reaches the water line.

In at least some embodiments, the filter is accessible when the pool cleaner is secured to the edge of the pool because it is at the front of the pool cleaner and the front of the pool cleaner is disposed at the water line when the pool cleaner is secured to the pool edge, insofar as the front is the side of the autonomous pool cleaner that is perpendicular to sides, perpendicular to wheels/tracks included on the pool cleaner, and/or parallel to axles extending through the pool cleaner. However, in other embodiments, the filter may be accessible from any peripheral wall of the pool cleaner and the pool cleaner may be configured to orient a particular peripheral wall of the pool cleaner with the water line prior to securing the pool cleaner to the edge (e.g., the particular peripheral wall may be oriented with the water line when or as the pool cleaner reaches the water line). Consequently, a user need not remove the autonomous pool cleaner from the water or hold the pool cleaner at the water line to service the filter. Moreover, the end user need not install or place a garage, housing, or any other such device in the pool or on the pool edge/pool deck that might change the aesthetic of the pool, collect debris/algae/etc., create a tripping hazard or otherwise negatively impact a pool.

In at least some embodiments, the edge securing assembly presented herein is or includes extendable arms (or retractable, when viewed from a different perspective). The extendable arms may be disposed within the periphery (e.g., length and/or width) of the autonomous pool cleaner during cleaning operations and may extend beyond the periphery (e.g., length) of the autonomous pool cleaner at the cessation of cleaning operations to secure the autonomous pool cleaner to the edge of a pool. Thus, the extendable arms will not interfere with cleaning operations of the autonomous pool cleaner. For example, the extendable arms will not impact steering or debris dislodgement operations of the autonomous pool cleaner. That is, the autonomous pool cleaner may steer or dislodge debris in accordance with its normal operations and the programming or functionality of these components need not change to accommodate the extendable arms. Consequently, in at least some embodiments, the edge securing features (e.g., the extendable arms) may be easily retrofitted onto a variety of autonomous pool cleaners.

Figure 1B:
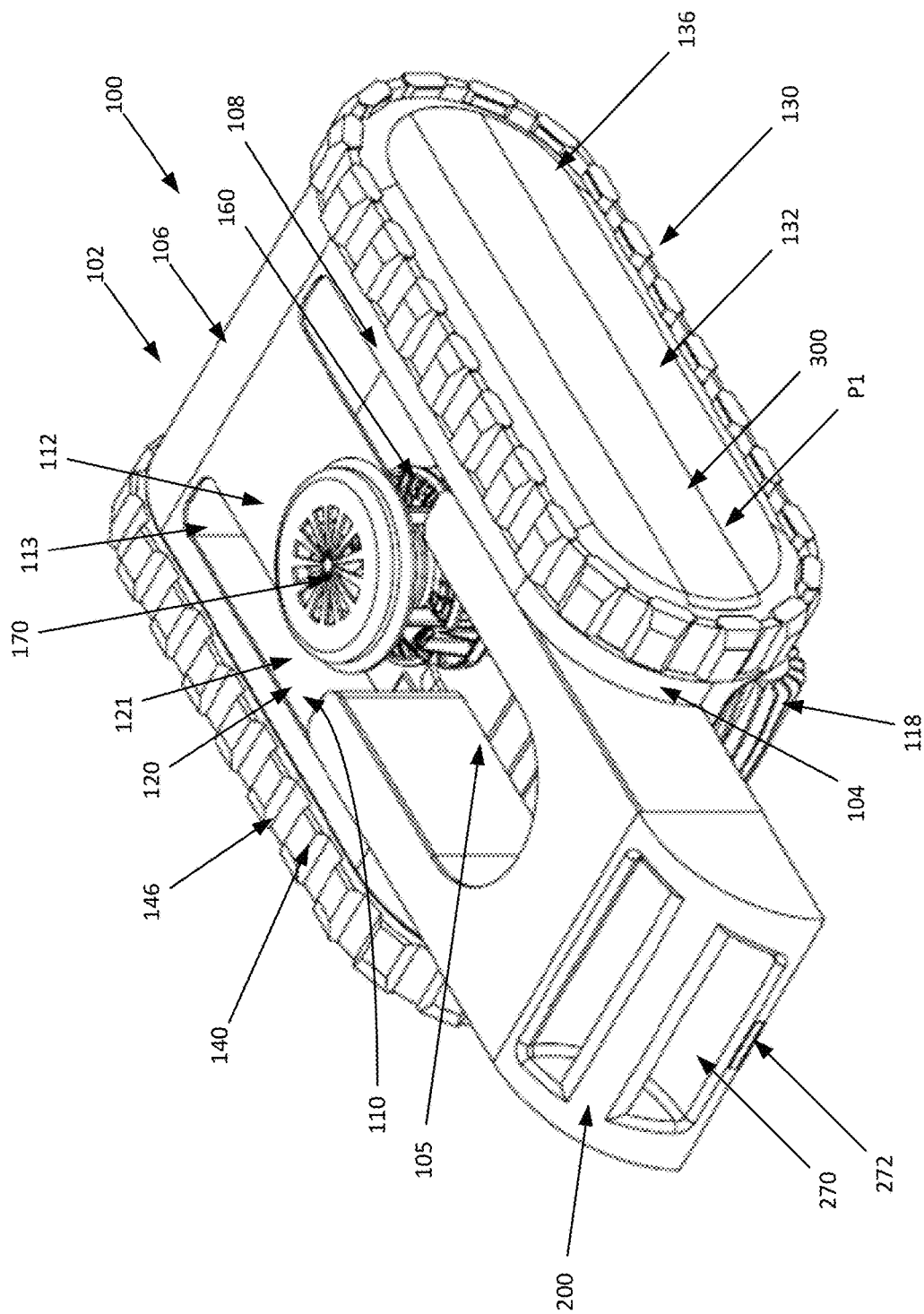

Now referring to FIGS. 1A and 1B for a high-level description of an autonomous pool cleaner 100 including a filter 200 and an edge engagement assembly 300 according to an example embodiment of the present invention. The autonomous pool cleaner 100 includes a main body 102 with a top 112, a bottom 114 (see FIG. 3), and peripheral walls 103 that extend between the top 112 and the bottom 114. In the depicted embodiment, the peripheral walls 103 include a front 104, a back 106, a first side 108, and a second side 110. That is, in the depicted embodiment, the main body 102 includes a front 104 and back 106 that extend between sides 108 and 110. However, in other embodiments, the peripheral walls 103 may include any number of walls (i.e., one or more). For example, the main body 102 may include a single, circular peripheral wall 103 so that the main body 102 is substantially cylindrical (e.g., circular from a top plan view). Regardless, together, top 112, bottom 114 (see FIG. 3), and the one or more peripheral walls 103 (e.g., front 104, back 106, side 108, and side 110 in the depicted embodiment) define an interior cavity 120.

The interior cavity 120 houses various operational components included in the autonomous pool cleaner, such as components of a pump system and/or drive system. For example, the interior cavity may house motors configured to drive brushes 118, motor(s) 150 (see FIG. 3) to drive wheel assemblies 130 and 140 disposed on the main body 102, and/or a pump 160, such as an impeller and/or propeller configured to draw fluid (e.g., water), together with any dirt or debris floating therein, into the filter 200 (at least some of these components are described in further detail in connection with FIG. 3). In the depicted embodiment, brushes 118 are included on the front 104 and the back 106 of the main body 102, adjacent the bottom 114. Each of brushes 118 may be driven or free to rotate and may dislodge dirt and debris from surfaces of the pool while the pool cleaner is executing cleaning operations. However, brushes 118 are merely exemplary cleaning components and in other embodiments, the autonomous pool cleaner presented herein may include any number of brushes in any locations and/or other cleaning components (e.g., pressurized jets configured to dislodge dirt and/or debris from a pool surface).

Meanwhile, in the depicted embodiment, wheel assemblies 130 and 140 are endless track wheel assemblies. That is, wheel assembly 130 and wheel assembly 140 include endless track belt 136 and endless track belt 146, respectively, that each operate by rotating around two rotating elements, such as drive wheels, gears, drive pulleys, etc., disposed at opposite distal portions of their respective wheel assemblies 130 and 140. However, in other embodiments, wheel assembly 130 and wheel assembly 140 may include any combination of drive elements, such as wheels, in any location. Regardless, wheel assemblies 130 and 140 may be permanently coupled or removably coupled to the main body 102.

Additionally, in the depicted embodiment, wheel assembly 130 is disposed laterally exteriorly of the first side 108 and wheel assembly 140 is disposed laterally exteriorly of the second side 110. That is, wheel assembly 130 is permanently or removably coupled to side 108 of the main body and wheel assembly 140 is permanently or removably coupled to side 110 of the main body 102. Consequently, wheel assembly 130 defines a first lateral edge of the pool cleaner 100 and wheel assembly 140 defines a second lateral edge of the pool cleaner 100, the second lateral edge being opposite the first.

More specifically, in the depicted embodiment, wheel assembly 130 includes a side plate 132 and wheel assembly includes a side plate 142 (see FIG. 4) and these side plates 132 and 142 define the lateral edges of the pool cleaner 100. As is explained in further detail below, in some embodiments, edge engagement assembly 300 is coupled to at least one of side plate 132 and side plate 142 and may selectively extend therefrom without interfering with the operations of a track belt (e.g., track belt 136 and/or track belt 146) or other such drive elements included in that wheel assembly. Consequently, and advantageously, it may be possible to retrofit the edge engagement assembly 300 to any pool cleaner that includes wheel assemblies with side plates that define lateral edges of the pool cleaner without disassembling the pool cleaner. That being said, it may also be possible to retrofit the edge engagement assembly 300 to any pool cleaner with a main body that has exposed sides or any other suitable fixed lateral surface. In FIGS. 1A and 1B, the edge engagement assembly is in a non-deployed position P1 (which may also be referred to as a first position, a non-deployed configuration, or a first configuration).

Still referring to FIGS. 1A and 1B, in the depicted embodiment, the front 104 of the main body 102 is a portion of the main body 102 that extends between and is perpendicular to sides 108 and 110. That is, the front 104 is a peripheral wall 103 that extends between (and is perpendicular to) the lateral edges of the main body 102. From another perspective, the front 104 is a peripheral wall 103 that is parallel to the axes around which wheel assemblies 130 and 140 rotate and is defined as the leading surface of the main body 102 when wheel assembly 130 and wheel assembly 140 rotate "forwards."

However, in other embodiments, the front 104 may be defined in any manner. For example, if the pool cleaner 100 has a main body 102 that is substantially circular, spherical, or cylindrical, the front may be a portion of the main body which is perpendicular to and disposed forwardly of wheel assemblies included therein. Additionally or alternatively, the front 104 may be a portion of the main body 102 defined as the front by logic in a computing device controlling the pool cleaner 100 (e.g., onboard control system 165 shown in FIG. 3).

Still referring to FIGS. 1A and 1B, but now with an emphasis on FIG. 1B, the interior cavity 120 can also receive and support a filter 200 that can be installed, removed, or accessed via one of the peripheral walls 103 of the main body 102. In the depicted embodiment, the filter 200 can be installed via the front 104, in an upper section 121 of the interior cavity 120 (rails or supports 122 delineate the upper section 121 and support the filter 200 in the upper section 121, as is shown and described in connection with FIG. 3). However, this is merely an example, and it is to be understood that in various embodiments the filter 200 can be installed into the interior cavity 120 (or, more specifically, the upper section 121 of interior cavity 120) via any peripheral wall(s) 103, including a side and/or a back of the main body 102. That being said, for simplicity, the filter 200 is largely described herein in connection with a front-loading filter (e.g., a filter that is installable and removable via front 104) with the understanding that the front 104 is merely representative of a particular peripheral wall 103.

For example, in the depicted embodiment, the front 104 includes an open upper section 105 and the top 112 includes openings 113 that provide access (both physical and optical access) to the upper section 121 of the interior cavity 120. Openings 113 may generally map to the shape of the filter 200; however, the openings 113 in the top 112 may be at least slightly smaller than top dimensions of the filter 200 so that the filter is vertically restrained between the rails 122 (see FIG. 3) and the top 112 when disposed within the upper section 121. That is, the top 112 may overhang portions of the filter 200 so that the filter 200 can be seen via the openings 113 but is not removable or installable through openings 113. In other embodiments, the openings 113 can be any size or shape that retains the filter 200 in the upper section 121; alternatively, the top 112 need not include openings 113. By comparison, opening 105 (which is shown in the front 104, but may be provided on any peripheral wall 103) may be sized to allow the filter 200 to be slidably installed or removed from the upper section 121 of the interior cavity 120 so that the filter 200 is a front-loading filter.

Figure 2:
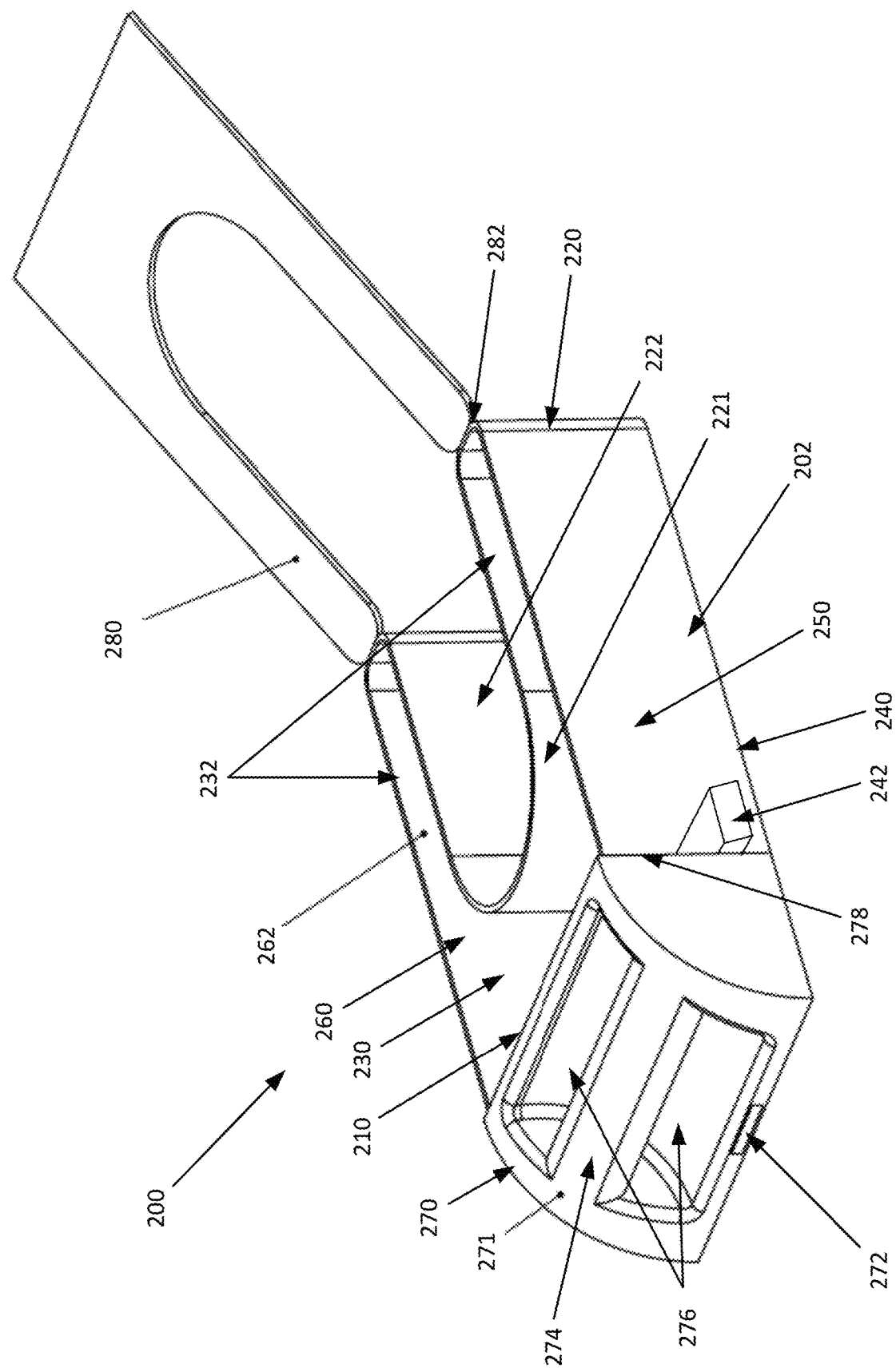
FIG. 2 is a front perspective view of the filter included in the autonomous pool cleaner of FIGS. 1A and 1B.

As can be seen in FIGS. 1A and 1B, during installation of the depicted embodiment, portions of the filter 200 (e.g., flanges 232, as shown in FIG. 2) slide past opposite sides of a pump 160 and an outlet 170 included in the pool cleaner 100 until an arcuate section (section 221, as is shown in FIG. 2) wraps around a third side of the pump 160 and the outlet 170, which may enhance the flow of water through the pool cleaner 100 (and through the filter 200). A user may effectuate this installation by pushing on a handle 270 included at a front end of the filter 200. That is, a user can install the filter 200 into the pool cleaner 100 by sliding the filter 200 through an opening included in or defined by one or more peripheral walls 103 (i.e., an opening defined between the top 112 and bottom 114 of the main body 102). During removal, the user may actuate (e.g., press) a lock mechanism 272 included on the handle 270 and pull the filter 200, via the handle 270, out of the upper section 121 of the interior cavity 120 of the pool cleaner 100.

Now turning to FIG. 2, at a high-level, the filter 200 includes a main body 202 and a handle 270. The main body 202 extends from a front 210 to a back 220. In the depicted embodiment, the front 210 and back 220 are substantially aligned with the front 104 and back 106 of the main body 102 when the filter 200 is installed therein; however, even if the filter is a side-loading filter (or loads in some other manner), the front 210 of the filter may still be described herein as the side which is accessible by an end-user, regardless of the part of the pool cleaner from which it is accessible. That is, if the filter is installable and removable from a side of the pool cleaner 100, the edge/side of the filter 200 aligned with the side may be referred to herein as front 210.

In the depicted embodiment, the back 220 is defined by flanges 232, which are connected by an arcuate section 221, but separated by a U-shaped cavity 222 extending between the arcuate section 221 and the back 220. As mentioned, the arcuate section 221 and flanges 232 may be shaped and sized to substantially wrap around a portion of the pump 160 and the outlet 170 included in the pool cleaner 100. For example, the arcuate section 221 and flanges 232 may extend around approximately three-fourths of a circumference of the pump 160 and the outlet 170. The front 210 of the main body 202 is coupled to a rear surface 278 of the handle 270 and spaced from the flanges 232 so that an ingress section 230 is formed between the front 210 and the flanges 232.

In the depicted embodiment, the ingress section 230 and flanges 232 collectively define a filter interior 260. That is, the ingress section 230 and flanges 232 are formed by a bottom 240 and sidewalls 250 so that the ingress section 230 and flanges 232 define a unitary filter interior 260 with an open top 262 that can be selectively closed by a filter lid 280. Since the filter interior 260 collects dirt and debris drawn into the pool cleaner 100 during cleaning operations (e.g., dirt and debris floating in water drawn into pool cleaner by pump 160), the filter interior 260 needs to be periodically cleaned, emptied, or otherwise serviced and the filter lid 280 facilitates this servicing (by selectively closing/opening the open top 262 of the filter interior 260).

In the depicted embodiment, lid 280 is hingedly coupled to the back 220 of the main body 202 via hinges 282. Notably, when the filter 200 is installed within the upper section 121 of the interior cavity 120 (of the pool cleaner 100), the portions of the top 112 overhanging flanges 232 may ensure the lid 280 remains closed during cleaning operations. That is, top 112 may ensure that the filter interior 260 remains closed (e.g., sealed by lid 280) while installed in the pool cleaner 100. However, in other embodiments, the filter interior 260 may be selectively closed in any manner that seals the filter interior 260 during cleaning operations and allows the filter interior 260 to be periodically serviced (e.g., cleaned) when the filter 200 is removed from the pool cleaner 100.

Figure 3:
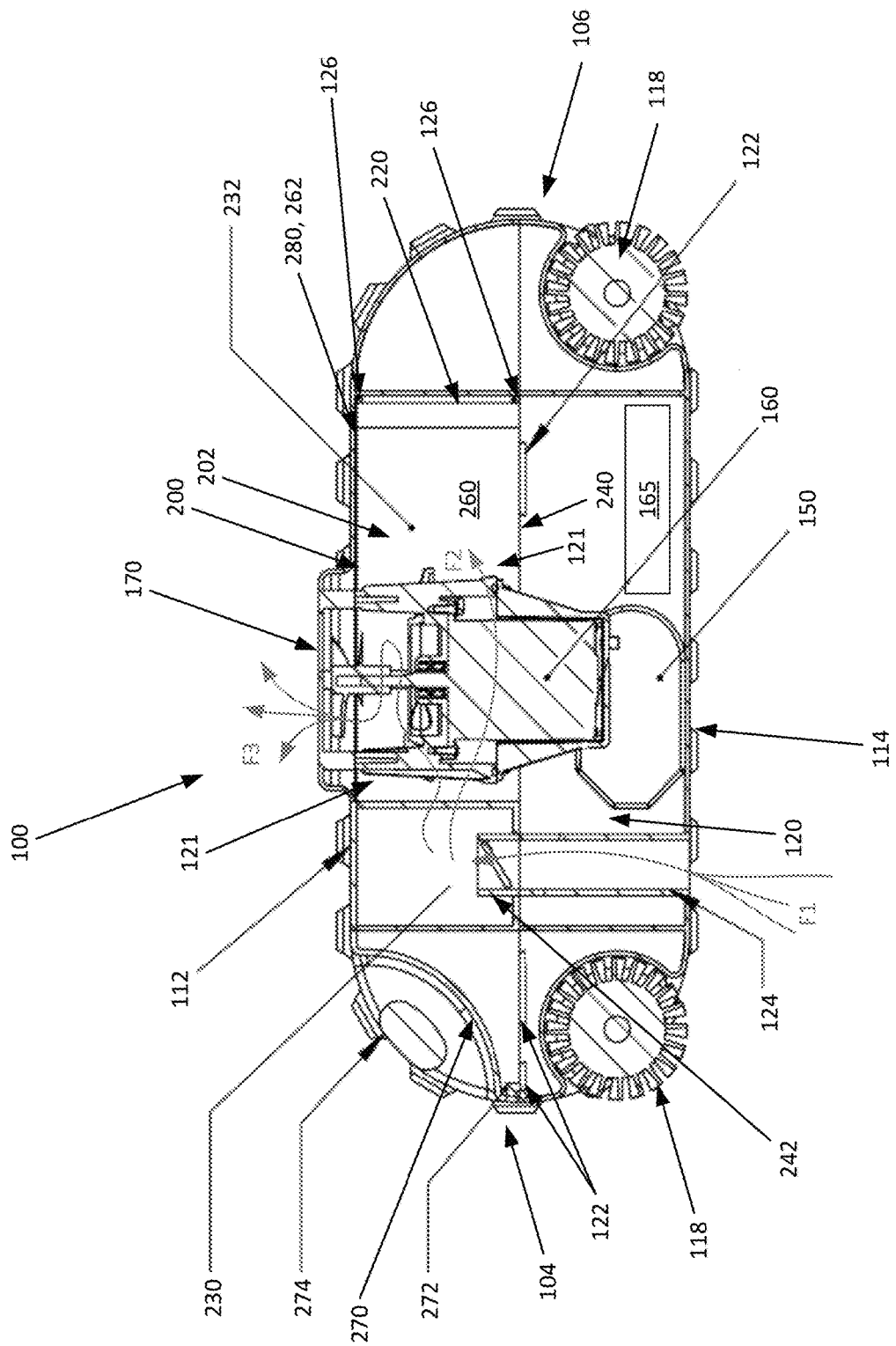
FIG. 3 is a sectional view of the autonomous pool cleaner of FIGS. 1A and 1B taken along line A-A of FIG. 1A.

Still referring to FIG. 2, but now with reference to FIG. 3 as well, in the depicted embodiment, the sidewalls 250 (including the back 220 and the arcuate section 221) may be or include water permeable surfaces that allow water, but not dirt or debris to pass therethrough. That is, sidewalls 250 may be or include a sieve or filter (such as a fine mesh material) that allows water, but not dirt, to pass therethrough. Meanwhile, the lid 280 may be water impermeable and the bottom 240 may be water impermeable except for an intake 242 that selectively allows water and debris to enter the filter interior 260 (at the ingress section 230). The intake 242 may include a biased filter, a valve, or any other such feature that substantially prevents debris from exiting through the intake 242. That is, intake 242 may be or include a one-way valve. Regardless, the intake 242 may be fluidly coupled to an exterior surface of the pool cleaner via an inlet conduit 124 that extends between the intake 242 and the bottom 114 of the main body 102 of the pool cleaner 100.

Thus, as the pump 160 operates, the pump 160 may draw water, dirt, and debris (including dirt and debris loosened by brushes 118) into the ingress section 230 of the filter interior 260 via intake 242 (and inlet conduit 124), as is shown by flow F1. Once water, dirt, and debris enters the filter interior 260, the pump 160 will cause the dirt and debris to swirl through the ingress section 230 and/or flanges 232, as is shown by flow F2. The pump 160 will also cause the water to swirl through the filter interior 260; however, eventually water will exit through the sidewalls 250 (e.g., through arcuate section 221) and exit the pool cleaner 100 via outlet 170, as is shown by flow F3. That is, the pump 160 will draw water, dirt, and debris into filter 200 and filter 200 will capture dirt and debris while expelling water in accordance with filtering techniques now known or developed hereafter.

Still referring to FIGS. 2 and 3, but now with an emphasis on FIG. 3, as mentioned, in the depicted embodiment the pool cleaner 100 generally supports the filter 200 in an upper section 121 of the interior cavity 120. To effectuate this, the interior cavity 120 includes rails 122 that support the filter 200 in the upper section 121 while allowing the filter 200 to slide in a front-to-back direction during insertion or removal of the filter 200 from the interior cavity 120. As was also mentioned above, in at least some embodiments, the filter 200 includes a lock mechanism 272 that selectively prevents the filter 200 from sliding in a front-to-back direction on rails 122.

Generally, the lock mechanism 272 may be any mechanism that selectively secures the filter 200 within the interior cavity 120 (or more specifically, the upper section 121 of the interior cavity 120). However, as one example, the lock mechanism 272 may be a detent that engages a rail 122 disposed adjacent the front 104 of the main body when the filter 200 is fully installed into the interior cavity 120. Thus, the filter 200 may automatically lock within the interior cavity 120 when fully installed therein. Then, to disengage the detent from the forward most rail 122, a user can actuate the lock mechanism 272 to disengage the detent. As another example, the lock mechanism 272 could be electrically actuated and controlled by a computing device controlling operations of the pool cleaner 100, such as the onboard control system 165, so that, for example, the filter 200 is only removable from the interior cavity 120 when the computing device (e.g., onboard control system 165) sets the pool cleaner to a servicing mode, determines the pool cleaner 100 is at a water line of the pool, and/or determines the edge engagement assembly 300 is engaged with a pool edge.

In addition to or as an alternative to the lock mechanism 272, the main body 102 may include filter posts 126 that engage the back 220 to selectively secure the filter 200 in the interior cavity 160 when the filter 200 is full installed in the interior cavity. In some embodiments, the filter posts 126 may be spring biased to cause the filter 200 to eject (at least partially) from the interior cavity in response to actuation of the lock mechanism 272 (e.g., to initiate filter removal). This ejection (or at least partial ejection) may move the filter 200 forwardly with respect to the main body 102 of the pool cleaner (e.g., upwards when the pool cleaner is vertical), which may make it easier for an end user to remove the filter 200, as is explained in further detail below.

Turning back to FIG. 2, in the depicted embodiment, the handle 270 is substantially hollow member with an arcuate outer wall 271 that spans the height of the main body 202 of the filter 200 (e.g., outer wall 271 extends from the open top 262 to the bottom 240). The outer wall 271 includes a grip member 274 that is defined between two cavities 276. The cavities 276 are above and below the grip member 274 and allow a user's hand to extend into the handle 270 when gripping the grip member 274. This provides the user with a handle 270 that is sturdy and easy to grasp during filter removal or installation operations. This is important considering that the end user will typically need to grip the handle 270 when crouched or bent over (e.g., when in an unnatural lifting position) and when the handle is wet and disposed below the user's feet.

Figure 4:
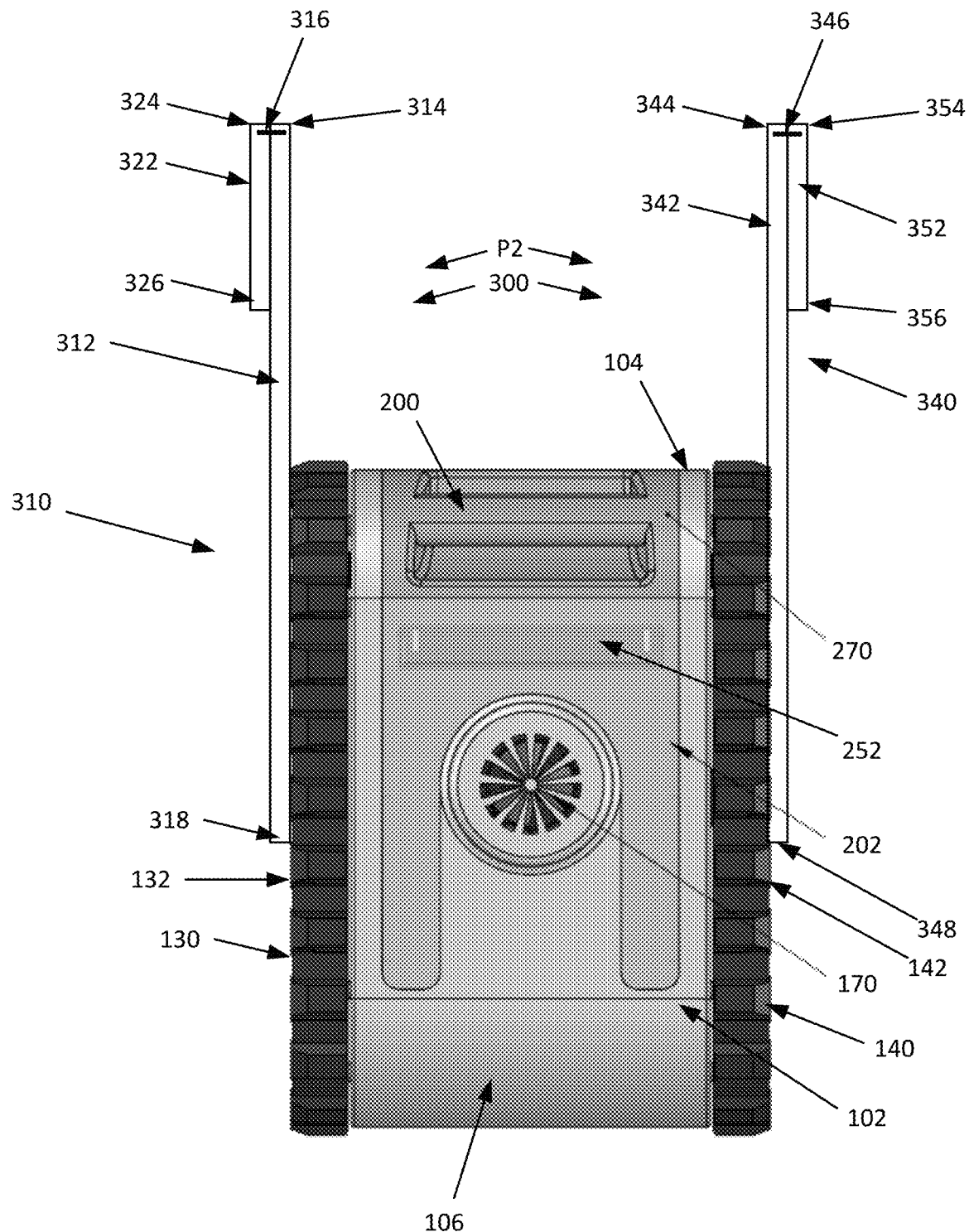
FIG. 4 is a top perspective view of the autonomous pool cleaner of FIGS. 1A and 1B that illustrates an edge engagement assembly in a partially deployed positioned, according to an example embodiment.
Figure 5A:
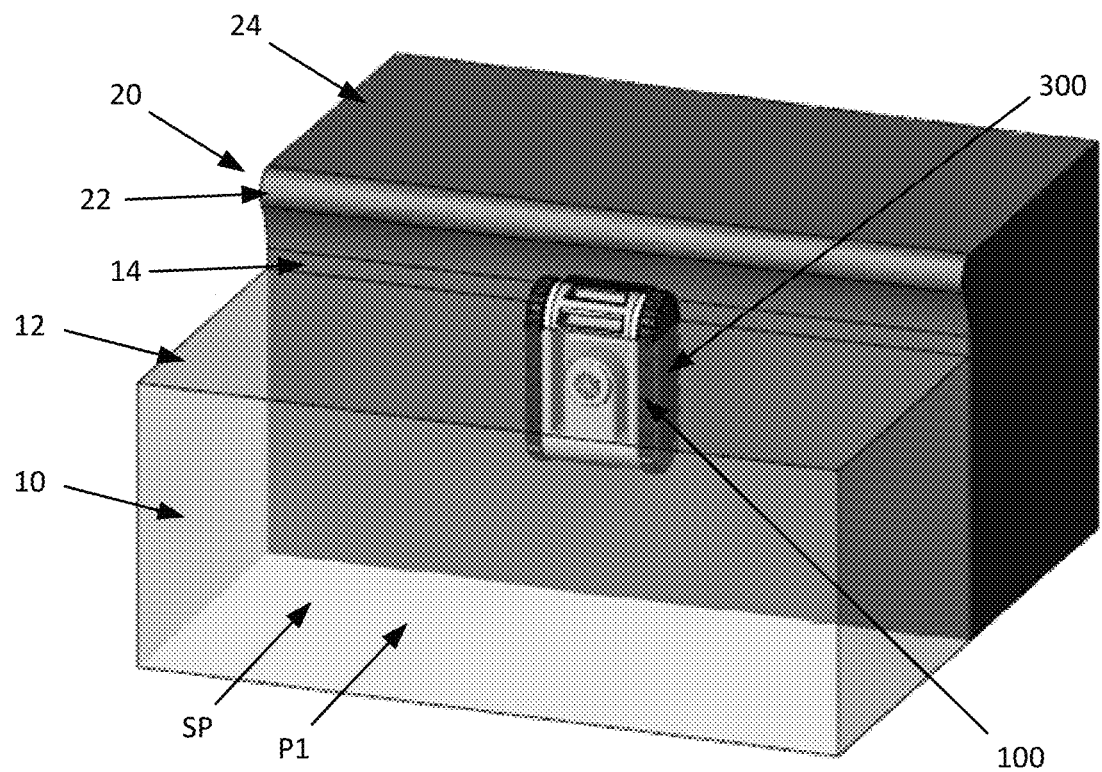
FIGS. 5A and 5B are top and side perspective views, respectively, of the autonomous pool cleaner of FIGS. 1A and 1B at a water line of a pool, prior to deploying its edge engagement assembly.
Figure 5B:
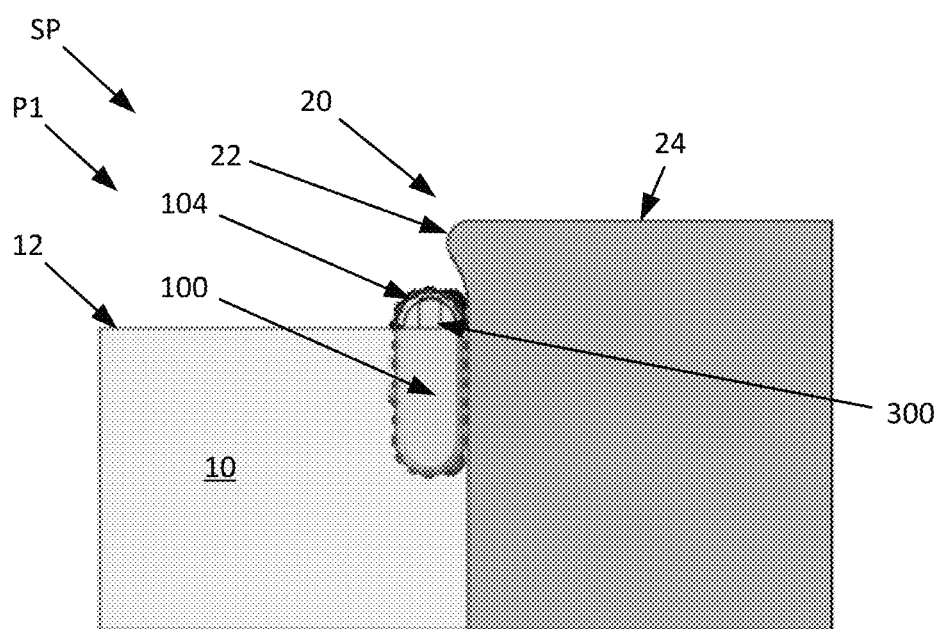

Now turning to FIG. 4, this Figure illustrates one embodiment of an edge engagement assembly 300 while in a partially deployed position P2 (which may also be referred to as a second position, a partially deployed configuration, or a second configuration). Notably, in the depicted embodiment, the edge engagement assembly 300 extends beyond front 104; however, this is merely an example. In other embodiments, the edge engagement assembly 300 may be configured to extend beyond any peripheral wall from which the filter is removable (and/or into which the filter is installable). Regardless, in the partially deployed position P2, the engagement assembly 300 extends beyond at least one of the peripheral walls 103 of the main body 102 of the pool cleaner, but features of the engagement assembly 300 configured to secure the pool cleaner to a pool edge may not yet be deployed.

For example, in the depicted embodiment, the edge engagement assembly 300 includes two extendable arms: a first arm 310 and a second arm 340. The first arm 310 is coupled to a first lateral edge of the main body 102 and the second arm 340 is coupled to a second lateral edge of the main body 102, opposite the first lateral edge. That is, the first arm 310 is coupled to the side plate 132 of the first wheel assembly 130 and the second arm 340 is coupled to the side plate 142 of the second wheel assembly 140. Each arm includes two segments that are rotatably coupled together. Extending the first segments partially deploys the first arm 310 and the second arm 340 and extending the second segments fully deploys the first arm 310 and the second arm 340. These segments allow the extendable arms to expand, incrementally or simultaneously, in a first direction and a second direction to secure the pool cleaner 100 to an edge of a pool.

More specifically, in the depicted embodiment, the first arm 310 includes a main segment 312 that extends from a proximal end 318 to a distal end 314. The proximal end 318 is coupled to the exterior side plate 132 of wheel assembly 130 and the distal end 314 is movable beyond the front 104 of the main body 102. In some embodiments, the proximal end 318 is fixedly coupled to the side plate 132 and the distal end 314 is movable with respect to the proximal end 318 (e.g., the main segment 312 may be telescopic). Additionally or alternatively, the proximal end 318 may be movably coupled to the side plate 132 (e.g., via a rack and pinion arrangement) to allow the distal end 314 to move forwardly of the front end 104 of the main body 102 (with or without expanding in relation to the proximal end 318).

Regardless of how the main segment 312 expands (i.e., moves) beyond a peripheral wall of the pool cleaner (e.g., forwardly of the front end 104 of the main body 102), the distal end 314 of the main segment 312 is pivotally coupled to a proximal end 324 of a secondary segment 322 so that a distal end 326 of the secondary segment 322 can rotate about the distal end 314 of the main segment 312. More specifically, in the depicted embodiment, the proximal end 324 of the secondary segment 322 and the distal end 314 of the main segment 312 are mounted on axle 316 to allow pivotal movement of the secondary segment 322 about the distal end 314 of the main segment 312.

The second arm 340 is substantially similar to the first arm 310. That is, the second arm 340 includes a main segment 342 that extends from a proximal end 348 to a distal end 344. The proximal end 348 is coupled to the exterior side plate 142 of wheel assembly 140 and the distal end 344 is movable beyond the front 104 of the main body 102. In some embodiments, the proximal end 348 is fixedly coupled to the side plate 142 and the distal end 344 is movable with respect to the proximal end 348 (e.g., the main segment 342 may be telescopic). Additionally or alternatively, the proximal end 348 may be movably coupled to the side plate 142 (e.g., via a rack and pinion arrangement) to allow the distal end 344 to move forwardly of the front end 104 of the main body 102.

Moreover, and also similar to arm 310, the distal end 344 of the main segment 342 (of arm 340) is pivotally coupled to a proximal end 354 of a secondary segment 352 so that a distal end 356 of the secondary segment 352 can rotate about the distal end 344 of the main segment 342. More specifically, in the depicted embodiment, the proximal end 354 of the secondary segment 352 and the distal end 344 of the main segment 342 are mounted on axle 346 to allow pivotal movement of the secondary segment 352 about the distal end 344 of the main segment 342.

In the depicted embodiment, secondary segments 322 and 352 are rotatable on and disposed laterally exterior of their main segments 312 and 342, respectively. However, in other embodiments, the secondary segments 322 and 352 can be disposed in any position and may be movable in any manner with respect to their main segments 312 and 342.

Moreover, although not shown, in at least some embodiments, the first arm 310 and second arm 340 may include motors to drive motion of the main segments 312, 342 with respect to the main body 102 of the pool cleaner and to drive motion of the secondary segments 322, 352 with respect to the main segments 312, 342. Additionally or alternatively, the first arm 310 and second arm 340 may include linkages that translate motion from motors included in the interior cavity 120 of the pool cleaner 100 to the secondary segments 322, 352. For example, the pool cleaner 100 may be configured to drive movement of the main segments 312, 342 until the main segments 312, 342 are fully extended and, then the motion imparted to the main segments 312, 342 may be imparted to the secondary segments 322, 352 via gearing and linkages formed with various mechanical components. International Application Publication No. WO2016/196433, which is hereby incorporated by reference in its entirety, describes at least one example embodiment in detail.

That all being said, in other embodiments, the engagement assembly 300 need not include a pair of arms and may include one or more arms. For example, the pool cleaner 100 might include only arm 310, only arm 340, or an arm not depicted in the Figures, such as a single arm that is disposed beneath the bottom 114 of the main body 102, atop the top 112, or any other location. In embodiments with a single arm, the single arm may be centrally located with respect to a lateral dimension of the main body 102 (e.g., between wheel assemblies 130 and 140 and aligned with the pump 160 and outlet 170 in the depicted embodiment).

Still further, in yet other embodiments, the edge engagement assembly 300 need not include an extendable arm and can include any other element or feature that can expand, rotate, and/or extend into position to couple the pool cleaner 100 to an edge of a pool. For example, the edge engagement assembly 300 may be or include an elastic cord (e.g., a bungee cord) with a hook, grip, suction member, etc. that can be secured to an edge of the pool when the pool cleaner is water line of a pool and the elastic cord is stretched away from the pool cleaner 100.

Moreover, regardless of how the engagement assembly 300 engages an edge of a pool, in some embodiments, a bottom 114 of the main body 102 may also include various engagement elements (e.g., suction, friction, and/or surface tension elements now known or developed hereafter) that can supplement the engagement provided by a distal end of the edge engagement assembly 300. That is, the bottom 114 of the main body 102 may be releasably secured to a pool wall while an edge engagement assembly releasably engages a pool edge. Notably, when a majority of the pool cleaner is in the water (i.e., is disposed beneath a water line of the pool), the pool cleaner is relatively light and, thus, can be secured to the wall and/or edge of a pool with a relatively small attachment force.

Now turning to FIGS. 5A, 5B, 6A, 6B, 7A, 7B, 8A, and 8B, generally, these figures depict operations of the autonomous pool cleaner presented herein when servicing is required. In some embodiments, the autonomous pool cleaner 100 may perform these operations at the end of a cleaning cycle. Additionally or alternatively, the autonomous pool cleaner 100 may interrupt a cleaning cycle to perform these operations, for example, if a fault condition (e.g., full filter) is detected during a cleaning cycle.

Regardless of why the autonomous pool cleaner 100 begins to perform these operations (which may be referred to as servicing or filter servicing operations), when the autonomous pool cleaner 100 is in a pool 10 and commences servicing operations, the autonomous pool cleaner 100 begins climbing a pool wall 14 (the pool cleaner 100 may detect and climb a wall in accordance with any techniques now known or developed hereafter). In the embodiment depicted in FIGS. 5A and 5B, the pool cleaner 100 climbs the wall 14 until the front 104 is at or above a water line 12.

However, in other embodiments, the pool cleaner 10 may climb wall 14 until any desirable peripheral wall 103 is disposed at or above water line 12. Additionally or alternatively, a pool cleaner 100 may turn upon reaching the water line 12 to orient a particular peripheral wall 103 with the water line 12. For example, if the filter 200 is a side-loading filter (e.g., installable and removable via side 110), the pool cleaner may drive forwardly up wall 14 and turn to orient the side (e.g., side 110) as or after the pool cleaner reaches the water line 12. Alternatively, the pool cleaner 100 may drive up wall 14 in a zig-zag pattern, sideways, or any other manner possible with the wheel assemblies included therein until the side of the pool cleaner (and the front of the filter) reaches the water line 12.

Since the edge engagement assembly is configured to extend beyond the same peripheral wall that the filter is installable into/removable from, aligning the filter with the water line 12 also aligns the edge engagement assembly 300 with the pool edge 12. That is, Once the pool cleaner 100 reaches the water line 12, the pool cleaner 100 is in a servicing position "SP." Notably, regardless of how the pool cleaner climbs a wall 14, the edge engagement assembly 300 remains in a non-deployed configuration P1. That is, the edge engagement assembly 300 remains in a non-deployed configuration P1 until the pool cleaner 100 reaches the servicing position SP (i.e., until a particular peripheral wall of the pool cleaner 100 reaches the water line 12).

Figure 6A:
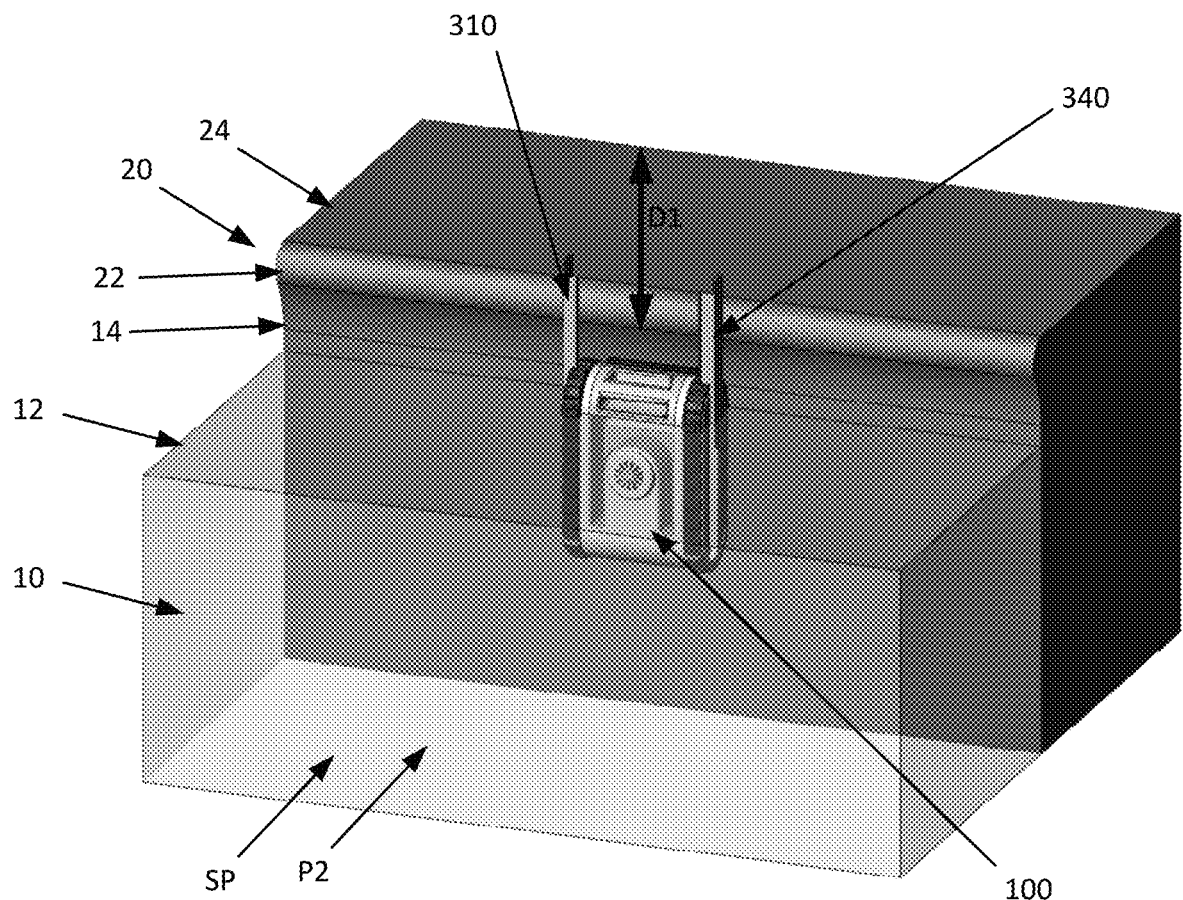
FIGS. 6A and 6B are top and side perspective views, respectively, of the autonomous pool cleaner of FIGS. 1A and 1B at the water line of the pool with its edge engagement assembly partially deployed.
Figure 6B:
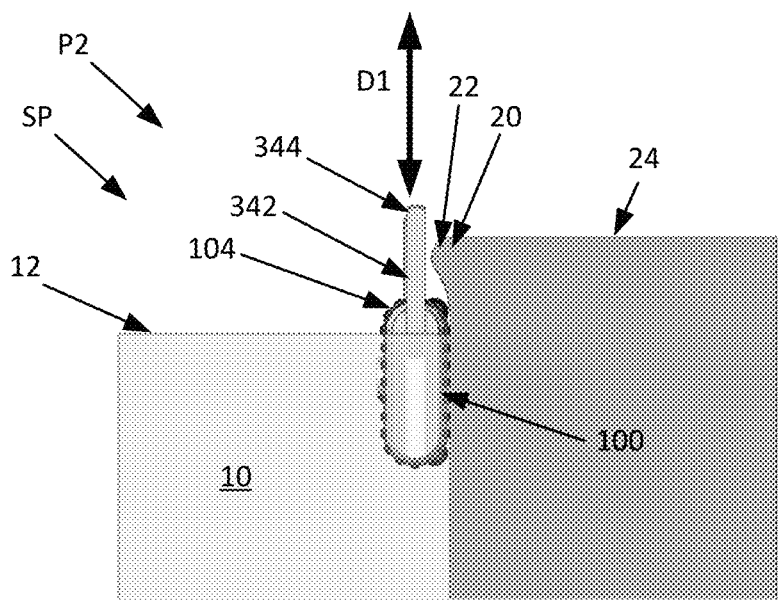

In the depicted embodiment, once the pool cleaner 100 reaches the servicing position SP, the pool cleaner 100 begins to deploy its edge engagement assembly 300, as is shown in FIGS. 6A and 6B, to secure the autonomous pool cleaner 100 to a pool edge 20, which includes coping 22 in the depicted embodiment. In the depicted embodiment, the pool cleaner 100 deploys the edge engagement assembly 300 automatically; however, in other embodiments, a user many manually deploy the edge engagement assembly 300 (e.g., by reaching towards the pool and pulling the edge engagement assembly 300 upwards). Regardless, in the initial deployment step, arm 310 and 340 begin to extend from the lateral edges of the pool cleaner 100 (e.g., side plates 132 and 142), as can be seen in FIGS. 6A and 6B. More specifically, the main segments 312 and 342 of arms 310 and 340, respectively, extend forwardly of the front 104 of the main body 102 of the pool cleaner 100.

Since the pool cleaner 100 is disposed on a pool wall 14 during this extension, the main segments 312 and 342 extend primarily vertically upwards (e.g., upwards along direction D1) until the arms 310 and 340 are in a partially deployed position P2. Notably, in this position, the distal ends 314 and 344 of main segments 312 and 342 are disposed above the edge 20, as well as a pool deck 24 extending away from the pool edge 20 (the side view shown in FIG. 6B only shows arm 340, but is to be understood to represent arms 310 and 340). In some embodiments, main segments 312 and 342 may extend fully to ensure the main segments 312 and 342 are disposed above the edge 20 and pool deck 24. Alternatively, although not shown, the main segments 312 and 342 may include sensors that allow the main segments 312 and 342 to detect the pool edge 20 and extend above the pool edge 20 (e.g., above coping 22).

Figure 7A:
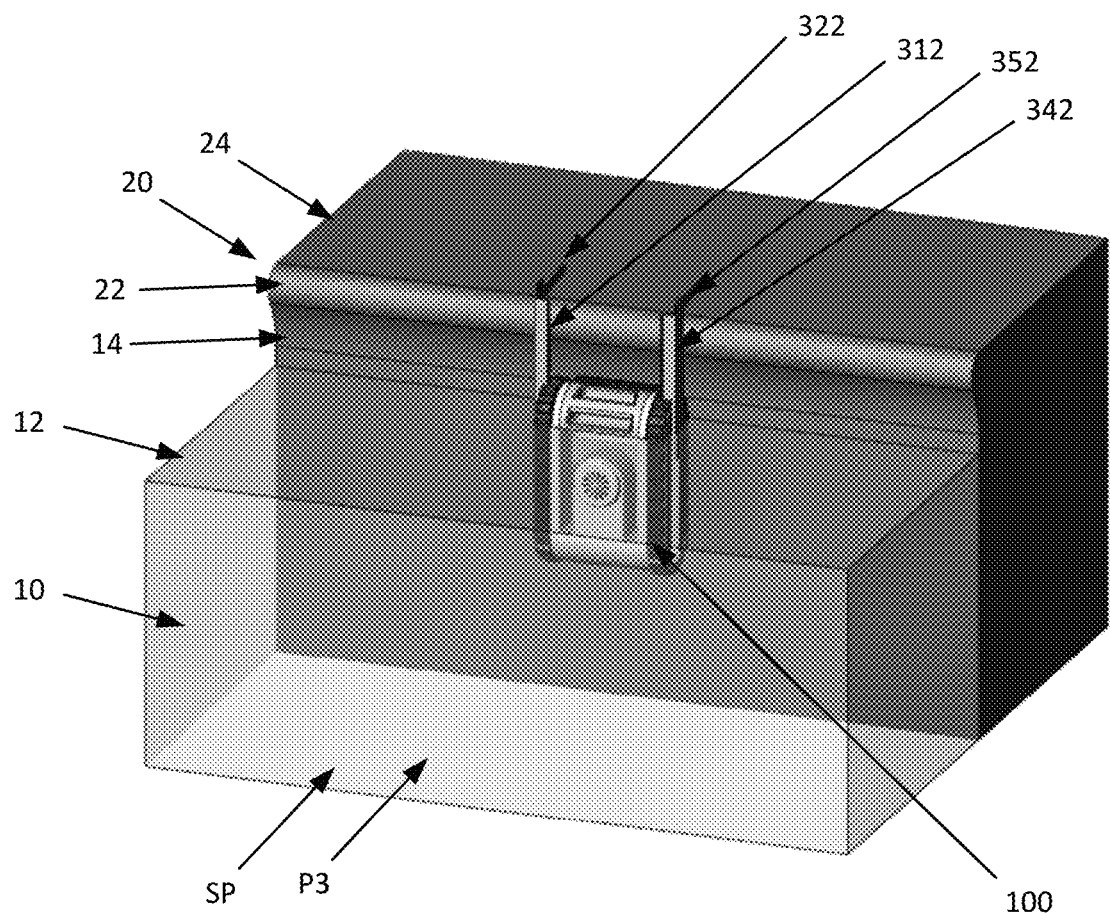
FIGS. 7A and 7B are top and side perspective views, respectively, of the autonomous pool cleaner of FIGS. 1A and 1B at the water line of the pool with its edge engagement assembly fully deployed.
Figure 7B:
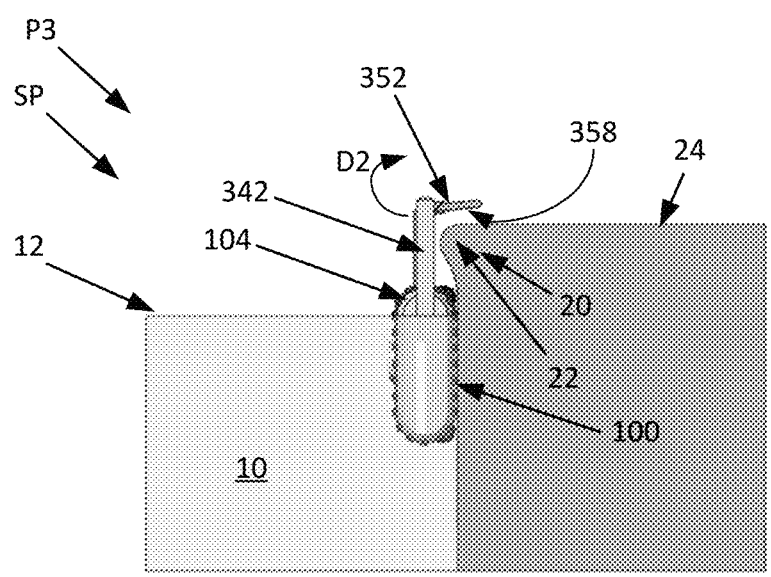
Figure 8A:
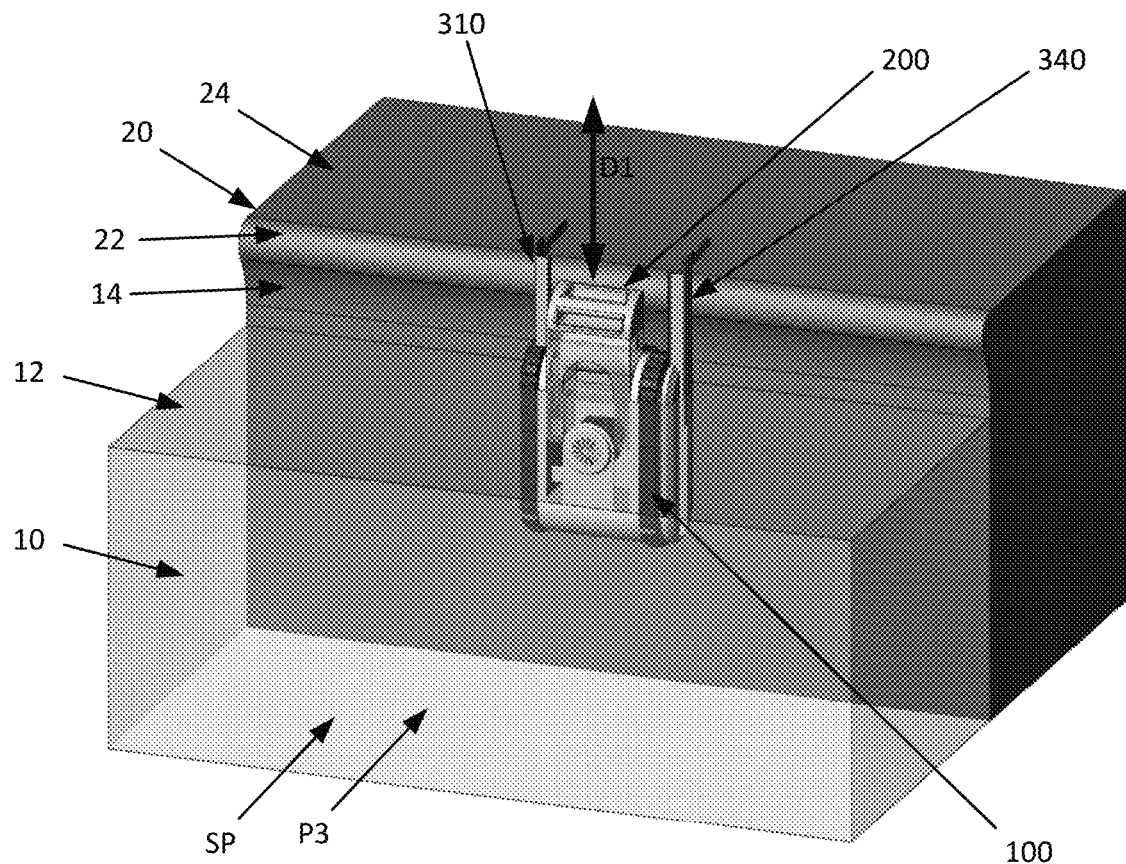
FIGS. 8A and 8B are additional top and side perspective views, respectively, of the autonomous pool cleaner of FIGS. 1A and 1B at the water line of the pool with its edge securing features fully deployed, but now with the filter partially removed.
Figure 8B:
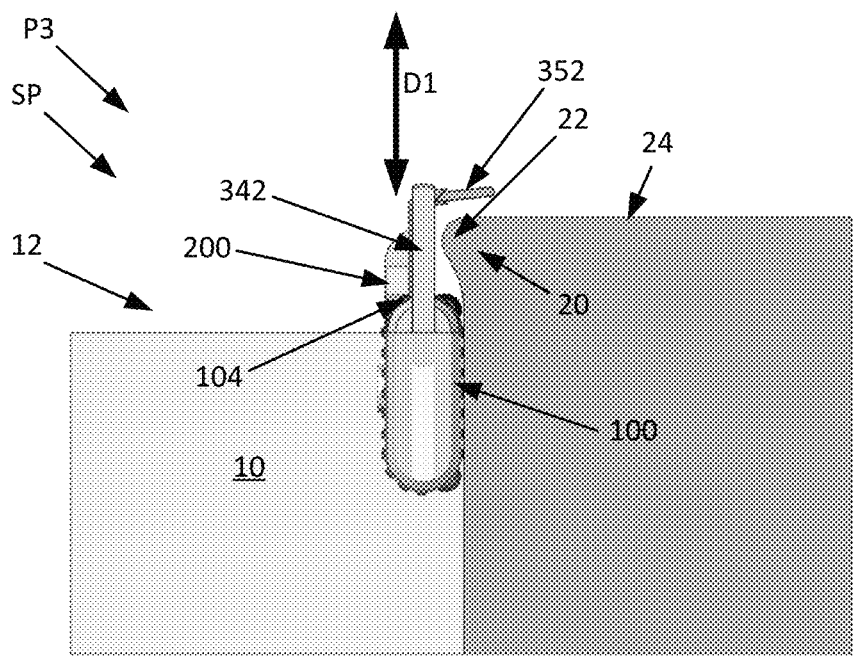

In the depicted embodiment, once main segments 312 and 342 are disposed above the edge 20 and pool deck 24, secondary segments 322 and 352 rotate (or can be manually rotated) with respect to their respective main segment 312, 342, until secondary segments 322 and 352 move into contact with a top of coping 22 and/or the pool deck 24, as can be seen in FIGS. 7A and 7B (the side view shown in FIG. 7B only shows arm 240, but is to be understood to represent arms 310 and 340). For example, in the depicted embodiment, secondary segments 322 and 352 rotate in a counter-clockwise direction D2 until the secondary segments 322 and 352 are engaged with the pool deck 24 and/or the coping 22 (thereby placing the edge engagement assembly 300 in its fully deployed position P3). This engagement may secure the pool cleaner 100 to the pool edge 20 and ensure that the filter 200 is accessible from the pool edge 20. In some embodiments, a bottom 358 of the secondary segment 352 (as well as a bottom of secondary segment 322, which is not labeled) may include a frictional pad or some other feature that increases the coefficient of friction of bottom 358 to improve the connection between the secondary segments 322, 352 and the pool deck 24 and/or coping 22.

Still referring to FIGS. 7A and 7B, as mentioned, in some embodiments, the secondary segments 322 and 352 need not rotate after the main segments 312 and 342 and, instead or in addition, may rotate as the main segments 312 and 342 extend. Moreover, in some embodiments, after movement of the secondary segments 322 and 352, the main segments may retract or otherwise move downwards to increase the friction between the secondary segments 322 and 352 and the pool deck 24 and/or coping 22. Additionally or alternatively, this movement may move the pool cleaner 100 upwards, moving the front end 104 (or any other peripheral wall 103 from which the filter is removable) further above the water line 102. Still further, in some embodiments, secondary segments 322 and 352 need not rotate in direction D2 and, in fact, need not rotate with respect to their main segments 312 and 342 at all. Instead, the segments 322 and 352 can move in any manner with respect to their respective main segments 312 and 342.

Regardless of how the engagement assembly 300 engages an edge 20 of a pool 10, once the engagement assembly 300 is engaged with an edge 20, the filter 200 will be accessible from the edge 20. That is, an end user standing on the pool deck 24 and/or coping 22 can simply lean over the pool edge 20, actuate a lock mechanism 272, and grasp the filter 200 (e.g., via handle 270) to remove the filter 200 from the pool cleaner 100. The end user need not pull the entire pool cleaner 100 from the pool 10, need not hold or manipulate the pool cleaner 100 at the water line 12, nor otherwise attempt a physically demanding maneuver while leaning over the pool edge 20. In the depicted embodiment, the filter 200 is removable from the front 104; however, as mentioned, in other embodiments, the filter may be removable (and installable) via any peripheral wall and the edge engagement assembly 300 will still position the filter 200 in a location where the end user can remove the filter 200 without removing the pool cleaner from the pool or otherwise attempting a physically demanding maneuver while leaning over the pool edge 20.

Moreover, and now referring back to FIG. 2, in the depicted embodiment, the hinges 282 on the filter lid 280 are disposed at the back 220 of the main body 200 (which is disposed at the bottom of the pool cleaner 100 when the pool cleaner is in servicing position SP). Consequently, the back 220 of the main body 202 of the filter 200 (which, due to gravity, may be holding any collected dirt and debris) will remain closed until the filter 200 is completely removed from the pool cleaner 100. Since the back 220 serves as the bottom of the filter 200 during filter removal, it is important that the lid 280 remains sealed to the back 220 to prevent dirt and debris from escaping the filter 200 during removal of the filter 200. The top 112 of the main body 102 will prevent the lid 280 from rotating around hinges 282 until the hinges 282 are removed from the interior cavity 120 (e.g., above the top during removal operations).

Once the filter 200 is completely removed from the pool cleaner 100, an end user can open the lid 280 and service (e.g., clean) the filter 200. After servicing, the end user can reinstall the filter 200 by sliding the filter 200 downwards into upper section 121 of the interior cavity 120 of the pool cleaner 100 (along rails 122, as shown in FIG. 3). In some embodiments, the lock mechanism 272 may automatically reengage when the filter 200 is fully reinserted into the upper section 121. Alternatively, a user may need to actuate the lock mechanism 272 to lock the filter 200 into the upper section 121 and complete the installation of the filter 200. Regardless, once the filter 200 is installed (or reinstalled) in the pool cleaner 100, the pool cleaner 100 may complete the operations shown in FIGS. 5A, 5B, 6A, 6B, 7A, and 7B in reverse. That is, the pool cleaner 100 may retract arms 310 and 340 (for example, by first rotating secondary segments 322 and 352 and then retracting main segments 312 and 342) and then drive back down wall 14. Notably, when the pool cleaner 100 finishes a service and drives back down wall 14, no accessories or parts are left at the pool edge 20 or on the pool deck 24. Consequently, neither the pool cleaner 100 nor accessories associated therewith create a tripping hazard at the pool edge 20, change the aesthetic of the pool 10, or add an element to the pool 10 that might collect debris and dirt or facilitate algae growth.

Figure 9:
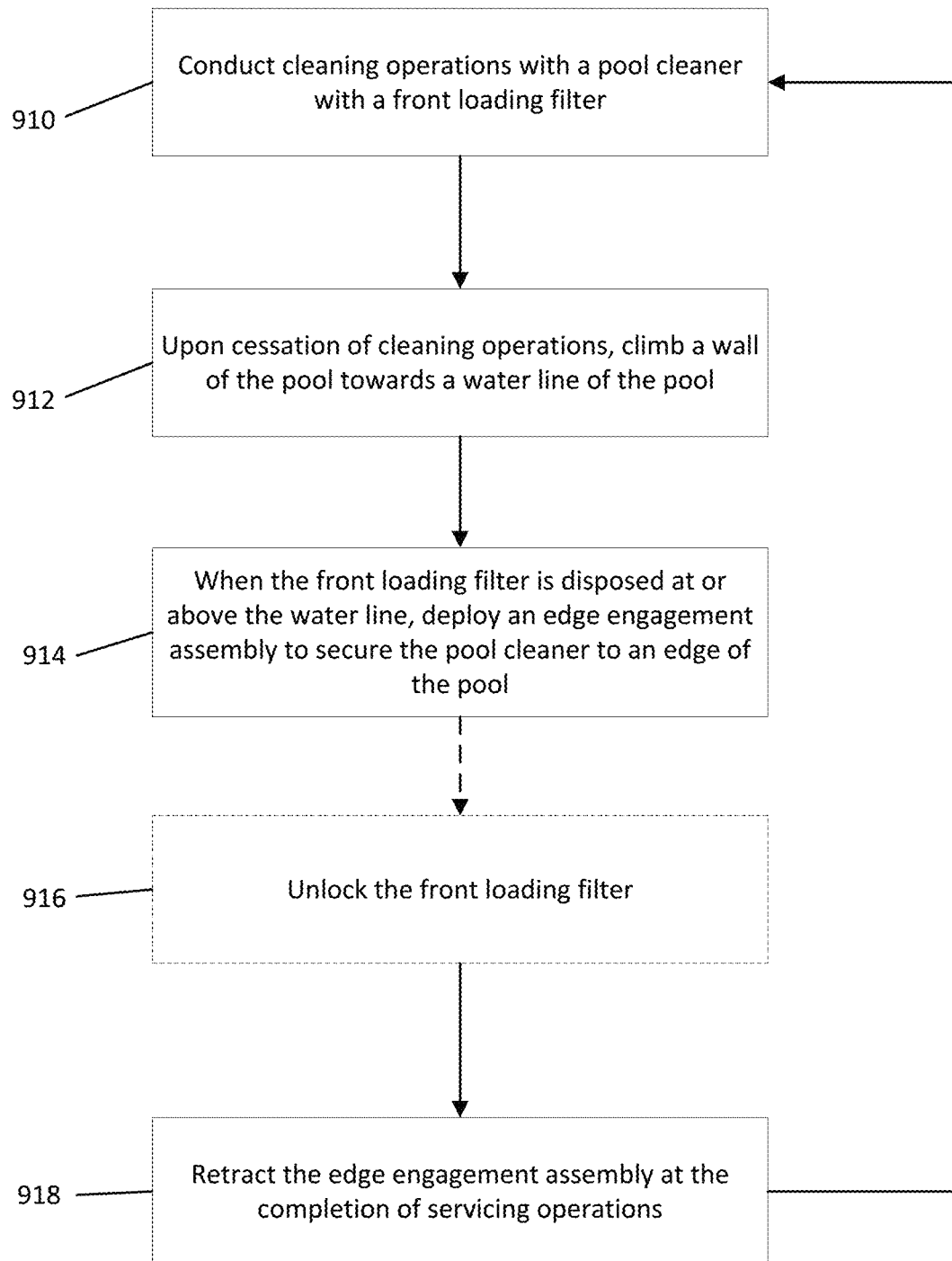
FIG. 9 is a high-level flow chart depicting the operations illustrated in FIGS. 5A, 5B, 6A, 6B, 7A, 7B, 8A, and 8B.

FIG. 9 illustrates a high-level flow chart of the operations depicted in 5A, 5B, 6A, 6B, 7A, 7B, 8A, and 8B. These operations may be controlled by a computing device (e.g., the onboard control system 265 shown in FIG. 3) included in the pool cleaner 100, a control system included in a power supply associated with the pool cleaner, and/or other computing device operatively connected to the pool cleaner 100. For example, a processor in the pool cleaner and/or a processor in a power supply connected to the pool cleaner may execute instructions stored in memory to execute the operations illustrated in FIG. 9. That being said, for simplicity, the operations depicted in FIG. 9 are described as being executed by onboard control system 265 with the understanding that this is merely one example. The operations are also described with reference to various components and features shown and described in any of the Figures preceding FIG. 9.

Initially, at 910, the onboard control system 265 causes the pool cleaner 100 to conduct cleaning operations in pool 10 in accordance with any cleaning techniques now known or developed hereafter (e.g., wall-to-wall cleaning, radial cleaning, sensor-based cleaning, etc.). Eventually, the onboard control system 265 determines, at 912, that the cleaning operations has or should be terminated. For example, if a cleaning operation is complete or a fault (such as the filter being full) is detected, the onboard control system 265 may determine that cleaning operations have or should be terminated, respectively. Upon cessation of cleaning operations (i.e., when the cleaning operations have terminated), the onboard control system 265 causes the pool cleaner 100 to climb wall 14, towards the water line 12 of pool 10. The pool cleaner 100 can climb towards the water line 12 based on feedback from one or more sensors included in pool cleaner 100 and operatively coupled to the onboard control system 265 (e.g., one or more accelerometers and/or one or more gyroscopes) or based on any other technique now know or developed hereafter.

In at least some embodiments, when the pool cleaner 100 climbs at 912, the pool cleaner 100 climbs in an orientation where the front 104 of the pool cleaner 100 is oriented towards the water line 12. That is, the front 104 may be the leading side or edge of the pool cleaner when the pool cleaner 100 climbs wall 14 and may define a top or uppermost side of the pool cleaner 100 while the pool cleaner is vertical on the wall 14. Thus, as the pool cleaner 100 approaches the water line 12, the front 104 of the pool cleaner 100 will reach the water line 12 first. However, as mentioned, the filter 200 need not be accessible via the front 104 and can be accessible via any peripheral wall 103. Thus, more generally, the pool cleaner climbs the wall 14 in a manner that orients the filter 200 with the water line 12 as or after the pool cleaner reaches the water line 12.

Thus, since the filter 200 is disposed at a front 104 of the pool cleaner 100 in the depicted embodiment, the filter 200 will reach the water line 12 first (or nearly first) and be accessible when the front 104 of the pool cleaner 100 reaches the water line 12. The pool cleaner 100 may detect the water line 12 based on any technique now know or developed hereafter (e.g., based on sensor feedback) and when the water line 12 is detected at 914, the onboard control system 265 delivers instructions to motors associated with the edge engagement assembly 300 to deploy the edge engagement assembly 300. When fully deployed, the edge engagement assembly 300 secures the pool cleaner 100 to an edge 20 of the pool 10, as is described in detail above. Consequently, a user can now easily access the filter 200 from the edge 20 of the pool 10.

As mentioned, in some embodiments, the filter 200 is electronically unlocked once the edge engagement assembly 300 has secured the pool cleaner 100 to the edge 20 of the pool 10. For example, if the edge engagement assembly 300 is deployed and the pool cleaner 100 has been disposed in a relatively stable position for a predetermined amount of time (e.g., an amount of time in the range of 3-10 seconds or more), the onboard control system 265 may determine that the edge engagement assembly 300 has secured the pool cleaner 100 to the edge 20 of the pool 10 and may electronically unlock (and/or at least partially eject) the filter 200 at 916. However, in other embodiments, a user may manually unlock the filter 200. Consequently, the unlocking at 916 is shown in dashed lines to illustrate that it is optional.

Regardless of how the filter 200 is unlocked, an unlocked filter 200 can be removed and serviced (e.g., cleaned) by a user. After servicing is complete, the edge engagement assembly 300 may retract (e.g., move back to a no-deployed position P1) at 918 and resume/restart or begin new cleaning operations at 910. In at least some embodiments, the onboard control system 265 determines that servicing is complete when the filter 200 is reinstalled into the pool cleaner 100. In other embodiments, the onboard control system 265 determines that servicing is complete when a lock mechanism associated with the pool cleaner (e.g., lock mechanism 272) is locked or re-actuated.

For example, after a user finishes servicing (e.g., cleaning) the filter 200, the user will replace the filter 200 (or place a new filter) into the interior cavity 120 pool cleaner 100 (e.g., by sliding the filter 200 into the interior cavity via the opening 105 in the front 104). In some embodiments, when the onboard control system 265 detects that the back 220 of the filter 200 is properly positioned in the interior cavity 120 (e.g., the back 220 is in contact with posts 126, as shown in FIG. 3), the onboard control system 265 may determine that servicing operations are complete and retract the edge engagement assembly 300. However, in other embodiments, the onboard control system 265 determines that servicing operations are complete and retracts the edge engagement assembly 300 when the lock mechanism 272 associated with the filter 200 is actuated by filter insertion (e.g., the lock mechanism 272 engages a rail 122). Regardless, once the edge engagement assembly 300 is retracted (and the filter 200 is reinstalled), the pool cleaner 100 may resume cleaning operations (or begin new cleaning operations).

To summarize, in one form, an autonomous pool cleaner is presented herein, the autonomous pool cleaner comprising: a main body with top, a bottom, and one or more peripheral walls that extend between the top and the bottom; a filter that is removably coupled to the main body, the filter being accessible for removal or installation via a particular peripheral wall of the one or more peripheral walls; and an edge engagement assembly configured to extend beyond the particular peripheral wall of the main body and removably secure the autonomous pool cleaner to an edge of a swimming pool so that the filter is accessible and vertically removable when the autonomous pool cleaner is secured to the edge.

In another form, an autonomous pool cleaner is presented herein, the autonomous pool cleaner comprising: a main body with a top, a bottom, and one or more peripheral walls that extend between the top and the bottom; a filter that is removably coupled to the main body and accessible for removal or installation via a particular peripheral wall of the one or more peripheral walls; an edge engagement assembly configured to extend beyond the particular peripheral wall and selectively secure the autonomous pool cleaner to an edge of a pool; and an onboard control system configured to deploy the edge engagement assembly when the particular peripheral wall is disposed at a water line of the pool and adjacent the edge, wherein deploying the edge engagement assembly secures the autonomous pool to the edge of the pool in a position where the filter is accessible by an end user standing on the edge.

In yet another form, a method for operating an autonomous pool cleaner is presented herein, the method comprising: determining that a cleaning operation performed by an autonomous pool cleaner with a filter that is removable from a peripheral wall of the pool cleaner has or should be terminated; based on the determining, causing the autonomous pool cleaner to climb a wall towards a water line of a pool; and upon reaching the water line, securing the autonomous pool cleaner to a pool edge with an edge engagement assembly in a position where the filter is accessible from the pool edge.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the pool cleaner described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. A filter for an autonomous swimming pool cleaner, comprising:
   a. a main body (i) defining an interior configured to receive unfiltered water of a swimming pool and (ii) comprising an inlet configured to direct the unfiltered water into the interior, wherein the filter includes a lid that is configured to selectively open providing access to the interior different from the inlet; and
   b. a handle coupled to the main body, wherein a lock mechanism for the filter is associated with the handle.

2. The filter of claim 1, wherein the main body comprises a bottom and sidewalls.

3. The filter of claim 2, wherein the sidewalls are water permeable.

4. The filter of claim 2, wherein the bottom is water impermeable.

5. The filter of claim 2, wherein the bottom further comprises the inlet.

6. The filter of claim 5, wherein the bottom is water impermeable except for the inlet.

7. The filter of claim 5, wherein the inlet comprises is a one-way valve.

8. The filter of claim 2, wherein the sidewalls further comprise opposing flanges, wherein the flanges define a back of the main body.

9. The filter of claim 1, wherein the handle is directly coupled to a front of the main body, and wherein the lid is directly coupled to a back of the main body.

\* \* \* \* \*